US009837066B2

(12) United States Patent
Wurtz

(10) Patent No.: US 9,837,066 B2
(45) Date of Patent: Dec. 5, 2017

(54) SYSTEM AND METHOD FOR ADAPTIVE ACTIVE NOISE REDUCTION

(71) Applicant: Lightspeed Aviation, Inc., Lake Oswego, OR (US)

(72) Inventor: Michael J. Wurtz, Lake Oswego, OR (US)

(73) Assignee: Light Speed Aviation, Inc., Lake Oswego, OR (US)

( * ) Notice: Subject to any disclaimer, the term of this patent is extended or adjusted under 35 U.S.C. 154(b) by 0 days.

(21) Appl. No.: 15/069,271

(22) Filed: Mar. 14, 2016

(65) Prior Publication Data

US 2016/0196819 A1 Jul. 7, 2016

Related U.S. Application Data

(63) Continuation of application No. 14/445,048, filed on Jul. 28, 2014, now abandoned.

(60) Provisional application No. 61/859,293, filed on Jul. 28, 2013.

(51) Int. Cl.

| | |
|---|---|
| ***H04B 15/00*** | (2006.01) |
| ***G10K 11/178*** | (2006.01) |
| ***H04R 1/10*** | (2006.01) |

(52) U.S. Cl.

CPC ....... *G10K 11/1786* (2013.01); *H04R 1/1083* (2013.01); *G10K 2210/1081* (2013.01); *G10K 2210/3027* (2013.01); *G10K 2210/3055* (2013.01); *H04R 2460/01* (2013.01)

(58) Field of Classification Search

CPC .......................... G10K 11/1786; H04R 1/1083

See application file for complete search history.

(56) References Cited

U.S. PATENT DOCUMENTS

| | | | |
|---|---|---|---|
| 3,227,836 | A | 1/1966 | Renwick, Sr. |
| 4,010,340 | A | 3/1977 | Palmaer |
| 4,118,600 | A | 10/1978 | Stahl |
| 4,160,135 | A | 7/1979 | Gorike |
| 4,239,945 | A | 12/1980 | Atoji et al. |
| 4,313,183 | A | 1/1982 | Saylors |

(Continued)

FOREIGN PATENT DOCUMENTS

| | | | |
|---|---|---|---|
| JP | 4558625 | B2 | 10/2010 |
| WO | 2009081193 | A1 | 7/2009 |

OTHER PUBLICATIONS

N. Narahari; Noise Cancellation in Headphones; M. Tech credit seminar report, Electronic Systems Group, EE Dept., IIT Bombay; Nov. 2003; p. 1.

(Continued)

*Primary Examiner* — Simon King

(74) *Attorney, Agent, or Firm* — Brooks Kushman P.C.

(57) ABSTRACT

A system and method for adaptive active noise reduction measure the acoustic response for each user to adaptively adjust and customize the ANR operation using adaptive filters to correct for any differences between the measured response and a targeted response. The system and method of various embodiments incorporate a closed loop control system with a feedforward input. The acoustic measurement and adaptation procedure is performed to adapt or tune at least one of the closed loop and feedforward control loops to provide adaptive ANR customized for each user and current ambient environment.

28 Claims, 12 Drawing Sheets

(56) References Cited

U.S. PATENT DOCUMENTS

| | | | | |
|---|---|---|---|---|
| 4,352,182 | A * | 9/1982 | Billi | G01R 27/28 375/228 |
| 4,455,675 | A | 6/1984 | Bose et al. | |
| 4,455,677 | A | 6/1984 | Fox | |
| 4,473,906 | A | 9/1984 | Warnaka et al. | |
| 4,491,980 | A | 1/1985 | Ichikawa | |
| 4,494,074 | A | 1/1985 | Bose | |
| 4,644,581 | A | 2/1987 | Sapiejewski | |
| 4,654,871 | A | 3/1987 | Chaplin et al. | |
| 4,747,145 | A | 5/1988 | Wiegel | |
| 4,827,458 | A | 5/1989 | D'Alayer de Costemore D'Arc | |
| 4,833,719 | A | 5/1989 | Carme et al. | |
| 4,922,542 | A | 5/1990 | Sapiejewski | |
| 4,941,187 | A | 7/1990 | Slater | |
| 4,944,020 | A | 7/1990 | Noro | |
| 4,955,729 | A | 9/1990 | Marx | |
| 4,980,920 | A | 12/1990 | Noro et al. | |
| 4,985,925 | A | 1/1991 | Langberg et al. | |
| 5,036,228 | A | 7/1991 | Noro | |
| 5,058,155 | A | 10/1991 | Larsen | |
| 5,091,954 | A | 2/1992 | Sasaki et al. | |
| 5,101,504 | A | 3/1992 | Lenz | |
| 5,144,678 | A | 9/1992 | Lenz | |
| 5,181,252 | A | 1/1993 | Sapiejewski et al. | |
| 5,182,774 | A | 1/1993 | Bourk | |
| 5,305,387 | A | 4/1994 | Sapiejewski | |
| 5,329,593 | A | 7/1994 | Lazzeroni et al. | |
| 5,343,523 | A | 8/1994 | Bartlett et al. | |
| 5,345,165 | A | 9/1994 | Froeschle | |
| 5,396,551 | A | 3/1995 | Lucey | |
| 5,426,689 | A | 6/1995 | Griffith et al. | |
| 5,557,653 | A | 9/1996 | Paterson et al. | |
| 5,590,208 | A | 12/1996 | Koyano et al. | |
| 5,604,813 | A | 2/1997 | Evans et al. | |
| 5,635,948 | A | 6/1997 | Tonosaki | |
| 5,647,011 | A | 7/1997 | Garvis | |
| 5,675,658 | A | 10/1997 | Brittain | |
| 5,708,725 | A | 1/1998 | Ito | |
| 5,729,605 | A | 3/1998 | Bobisuthi et al. | |
| 5,732,143 | A | 3/1998 | Andrea et al. | |
| 5,748,749 | A | 5/1998 | Miller et al. | |
| 5,825,897 | A | 10/1998 | Andrea et al. | |
| 5,870,484 | A | 2/1999 | Greenberger | |
| 5,913,163 | A | 6/1999 | Johansson | |
| 5,983,100 | A | 11/1999 | Johansson et al. | |
| 5,987,144 | A | 11/1999 | Carme et al. | |
| 6,069,959 | A | 5/2000 | Jones | |
| 6,078,675 | A | 6/2000 | Bowen-Nielsen et al. | |
| 6,091,830 | A | 7/2000 | Toki | |
| 6,118,878 | A | 9/2000 | Jones | |
| 6,130,953 | A | 10/2000 | Wilton et al. | |
| 6,278,786 | B1 | 8/2001 | McIntosh | |
| 6,567,525 | B1 | 5/2003 | Sapiejewski | |
| 6,597,792 | B1 | 7/2003 | Sapiejewski et al. | |
| 6,683,965 | B1 | 1/2004 | Sapiejewski | |
| 6,782,106 | B1 | 8/2004 | Kong et al. | |
| 6,831,984 | B2 | 12/2004 | Sapiejewski | |
| 6,873,862 | B2 | 3/2005 | Reshefsky | |
| 7,031,460 | B1 | 4/2006 | Zheng et al. | |
| 7,076,204 | B2 | 7/2006 | Richenstein et al. | |
| 7,076,681 | B2 | 7/2006 | Bose et al. | |
| 7,215,766 | B2 | 5/2007 | Wurtz | |
| 7,317,802 | B2 | 1/2008 | Wurtz | |
| 7,327,850 | B2 | 2/2008 | Crump et al. | |
| 7,412,070 | B2 | 8/2008 | Kleinschmidt et al. | |
| 7,483,540 | B2 | 1/2009 | Rabinowitz et al. | |
| 7,627,352 | B2 | 12/2009 | Gauger, Jr. et al. | |
| 7,668,308 | B1 | 2/2010 | Wurtz | |
| 8,155,334 | B2 | 4/2012 | Joho et al. | |
| 8,355,512 | B2 | 1/2013 | Pan et al. | |
| 8,416,960 | B2 | 4/2013 | D'Agostino et al. | |
| 8,488,807 | B2 | 7/2013 | Chiba et al. | |
| 8,526,628 | B1 | 9/2013 | Massie et al. | |
| 8,848,935 | B1 | 9/2014 | Massie et al. | |
| 8,908,876 | B2 | 12/2014 | Magrath et al. | |
| 2002/0015501 | A1 | 2/2002 | Sapiejewski | |
| 2003/0026440 | A1 | 2/2003 | Lazzeroni et al. | |
| 2005/0213774 | A1 | 9/2005 | Kleinschmidt et al. | |
| 2005/0276421 | A1 | 12/2005 | Bergeron et al. | |
| 2006/0262938 | A1 | 11/2006 | Gauger, Jr. et al. | |
| 2007/0025561 | A1 | 2/2007 | Gauger, Jr. et al. | |
| 2007/0253567 | A1 | 11/2007 | Sapiejewski | |
| 2007/0253568 | A1 | 11/2007 | Sapiejewski | |
| 2007/0253569 | A1 | 11/2007 | Bose | |
| 2008/0069378 | A1 | 3/2008 | Rabinowitz et al. | |
| 2008/0167092 | A1 | 7/2008 | Ueda et al. | |
| 2008/0181422 | A1* | 7/2008 | Christoph | G10K 11/1784 381/73.1 |
| 2008/0192942 | A1 | 8/2008 | Yamkovoy et al. | |
| 2008/0205663 | A1 | 8/2008 | Crump et al. | |
| 2008/0273713 | A1 | 11/2008 | Hartung et al. | |
| 2008/0273714 | A1 | 11/2008 | Hartung | |
| 2008/0273722 | A1 | 11/2008 | Aylward et al. | |
| 2008/0273723 | A1 | 11/2008 | Hartung et al. | |
| 2008/0273724 | A1 | 11/2008 | Hartung et al. | |
| 2008/0273725 | A1 | 11/2008 | Hartung et al. | |
| 2008/0317260 | A1 | 12/2008 | Short | |
| 2009/0003616 | A1 | 1/2009 | Kleinschmidt et al. | |
| 2009/0109894 | A1 | 4/2009 | Ueda et al. | |
| 2009/0226013 | A1 | 9/2009 | Burge | |
| 2009/0262969 | A1 | 10/2009 | Short et al. | |
| 2009/0271534 | A1 | 10/2009 | Acosta et al. | |
| 2009/0271639 | A1 | 10/2009 | Burge et al. | |
| 2009/0309416 | A1 | 12/2009 | Bose et al. | |
| 2009/0318074 | A1 | 12/2009 | Burge et al. | |
| 2010/0061564 | A1* | 3/2010 | Clemow | G10K 11/1788 381/71.6 |
| 2010/0098263 | A1 | 4/2010 | Pan et al. | |
| 2010/0098265 | A1 | 4/2010 | Pan et al. | |
| 2010/0128884 | A1 | 5/2010 | Sapiejewski et al. | |
| 2010/0202631 | A1 | 8/2010 | Short | |
| 2010/0239105 | A1 | 9/2010 | Pan | |
| 2010/0246836 | A1 | 9/2010 | Johnson, Jr. et al. | |
| 2010/0246845 | A1 | 9/2010 | Burge et al. | |
| 2010/0246846 | A1 | 9/2010 | Burge et al. | |
| 2010/0246847 | A1 | 9/2010 | Johnson, Jr. et al. | |
| 2010/0260361 | A1 | 10/2010 | Yamkovoy | |
| 2010/0272275 | A1 | 10/2010 | Carreras et al. | |
| 2010/0272276 | A1 | 10/2010 | Carreras et al. | |
| 2010/0272279 | A1 | 10/2010 | Joho et al. | |
| 2010/0272281 | A1 | 10/2010 | Carreras et al. | |
| 2010/0272282 | A1 | 10/2010 | Carreras | |
| 2010/0272283 | A1 | 10/2010 | Carreras et al. | |
| 2010/0274564 | A1 | 10/2010 | Bakalos et al. | |
| 2010/0278348 | A1 | 11/2010 | Yamkovoy et al. | |
| 2010/0278355 | A1 | 11/2010 | Yamkovoy | |
| 2011/0004465 | A1 | 1/2011 | Rose et al. | |
| 2011/0007907 | A1* | 1/2011 | Park | G10K 11/178 381/71.8 |
| 2011/0293103 | A1* | 12/2011 | Park | G10K 11/1782 381/57 |
| 2012/0014532 | A1* | 1/2012 | Kimura | H04R 1/1083 381/71.6 |
| 2012/0250873 | A1 | 10/2012 | Bakalos et al. | |
| 2013/0208908 | A1 | 8/2013 | Theiler et al. | |
| 2014/0072134 | A1* | 3/2014 | Po | G10K 11/1788 381/71.11 |
| 2014/0270222 | A1* | 9/2014 | Hendrix | H04R 1/24 381/71.6 |
| 2014/0314246 | A1* | 10/2014 | Hellman | G10K 11/16 381/71.11 |
| 2015/0003625 | A1* | 1/2015 | Uhle | H04R 3/002 381/71.6 |

OTHER PUBLICATIONS

Dr. Robert D. Collier; STTR Phase I: Feedforward Adaptive Noise Control; Sound Innovations, Inc. Lebanon, NH; 2005; pp. 1-2.

U Kjems and J. Jensen; Maximum Likelihood Based Noise Covariance Matrix Estimation for Multi-Microphone Speech Enhancement; http://www.retune-dsp.com/; EUSIPCO, 2012; pp. 1-4; Retune DSP, Denmark.

(56) References Cited

OTHER PUBLICATIONS

Aamir Anwar; Low Frequency Finite Element Modeling of Passive Noise Attenuation in Ear Defenders; Faculty of the Virginia Polytechnic Institute and State University; pp. 123; Jan. 12, 2005; Blacksburg, Virginia.

E.A.G. Shaw et al.; Acoustics of Circumaural Earphones; The Journal of the Acoustical Society of America; vol. 34, No. 9, pp. 14; Sep. 1962.

* cited by examiner

SYSTEM AND METHOD FOR ADAPTIVE ACTIVE NOISE REDUCTION

CROSS-REFERENCE TO RELATED APPLICATION

This application is a continuation of U.S. Ser. No. 14/445,048 filed Jul. 28, 2014, which claims the benefit of U.S. provisional application Ser. No. 61/859,293 filed Jul. 28, 2013, the disclosures of which are hereby incorporated in their entirety by reference herein.

TECHNICAL FIELD

This disclosure relates to a system and method for adaptive active noise reduction that may be used in various applications including headphones, headsets, and earphones, for example.

BACKGROUND

Active noise reduction (ANR) devices have been commercially available for over 20 years. In general, these devices use electronics to generate a signal with the same amplitude but opposite phase of the noise. This is accomplished using a closed loop feedback control system having a sensing microphone to detect the noise with the associated signal passed through a compensating filter and electronics to drive a speaker that produces a pressure wave out of phase with the noise, resulting in a net reduction or attenuation of the noise perceived by a user.

Techniques for designing a feedback control system for active noise reduction are well understood by those skilled in the art. In general, the goal may be summarized as selecting components to provide system operating characteristics that satisfy control theory feedback loop stability criteria and provide a net attenuation or reduction of sound pressure at some or all of the frequencies of interest. This is accomplished by determining an appropriate open loop gain G, defined as the output/input ratio when the loop including the driver, sensing microphone, and electronics is driven and measured with the loop open, i.e. without feedback. G is a complex function, such that its magnitude and phase vary with frequency.

The corresponding attenuation provided by a system with open loop gain G can be expressed as $1/(1-G)$. In closed loop ANR circumaural designs having ear cups with a cushion that seals against the head around the circumference of the ear, this is typically limited to frequencies under 1 kHz. Because of a need for more attenuation of the lower frequencies, some boosting or amplification of the sound pressures is tolerated at higher frequencies where passive attenuation is more effective. In closed loop control systems, the amount of attenuation at lower frequencies is dependent on the acceptable phase margin around the upper transition frequency where the magnitude of the open loop gain ($|G|$) reaches unity. Phase margin is defined as the phase difference between the phase angle of the open loop gain ($<G$) and zero degrees when $|G|=1$. If the open loop gain has a magnitude close to unity and a phase of close to zero degrees, the denominator of $1/(1-G)$ will be much less than unity resulting in the function $1/(1-G)$ being much greater than unity at those frequencies and thus boosting of the pressure around those frequencies. Any compensation that causes a net decrease in amplitude with increasing frequency, has a resultant negative phase shift with more phase shift associated with steeper attenuation.

If 60 degrees or more phase margins can be maintained when the magnitude of the open loop gain ($|G|$) is close to unity, then no high frequency boosting will exist. Unfortunately, this generally produces inadequate loop gain at lower frequencies where passive attenuation is not as significant. Many designs accept some amount of high frequency boosting (making some frequencies louder when the ANR is on or active) to gain more attenuation at lower frequencies. In the design of such a system, transport or transit delay between the microphone input and driver output uses up valuable phase margin, and without changing the compensation, increases boosting around frequencies where the magnitude of G ($|G|$) is approximately unity. As a result, the sensing microphone has been placed in close proximity to the speaker (driver) to minimize delay as a result of the travel time of the sound to reach the microphone to provide acceptable phase margin and increase system bandwidth. In addition, the assumption of constant pressure within the front cavity of the ear cup of circumaural headphones at the frequencies the system attenuates also supports this approach as a good design methodology.

As such, use of well understood principles of feedback control system design and accepted operating assumptions have resulted in prior art systems that position the sensing microphone close to the speaker (also referred to as the driver) to maximize system bandwidth while providing acceptable phase margin for the system to remain stable and avoid unacceptable boosting of higher frequencies. The system parameters to provide acceptable phase margin are generally determined during product development based on average anatomical data and representative use scenarios. These parameters are generally fixed for the life of the product, or in some cases may be infrequently changed during firmware updates, but do not change during each use. While suitable for many applications, this design methodology does not account for variations among users with respect to ear anatomy as well as ambient environment.

Microprocessors and various dedicated purpose digital devices have afforded the opportunity for more complex digital processing of audio signals. However, processing speed remains an important consideration for real-time applications as any significant delay (on the order of 10 milliseconds) may produce an unacceptable lag, echo, distortion, or similar effect leading to an unnatural listening experience that may also affect speech patterns. Delay also imposes an inherent limitation to the bandwidth of broadband cancellation. The desire to avoid these effects may result in limiting the ANR performance over certain frequency bands.

SUMMARY

A system and method for adaptive active noise reduction according to embodiments of the present disclosure measure the acoustic response for each user to adaptively adjust and customize the ANR operation using adaptive filters to correct for any differences between the measured response and a target response. The system and method of various embodiments incorporate a closed loop control system with a feedforward input. The acoustic measurement and adaptation procedure is performed to adapt or tune at least one of the closed loop and feedforward control loops to provide adaptive ANR customized for each user and current ambient environment.

During an initialization or calibration mode, the feedforward control is adapted to the user and ambient environment by measuring the transfer function from the ambient noise to the sense or error microphone positioned within the earcup of the headset. This information is used to implement a corresponding filter having the opposite phase to provide noise reduction or cancelation. To produce an accurate anti-noise signal that matches the acoustic noise in the ear cup using the ambient microphone as the sense microphone, the transfer function of the driver to error microphone must also be known. With the transfer functions of the ambient microphone to error microphone and the driver to error microphone known, it is possible to estimate the required target transfer function to produce perfect cancelation. This target transfer function can then be used to compute a realizable filter. This method differs from the typical approach used with adaptive filters that modifies coefficients to minimize the error energy using any of a number of strategies that may be characterized as gradient descent strategies. In contrast, using a method based on target transfer functions according to embodiments of the present disclosure is fundamentally different in that it is independent of the spectrum of the noise source, i.e. the amount of energy at a given frequency does not affect the target response, or the resulting realizable transfer function. As a further benefit, the problem with convergence of gradient descent methods with wide eigenvalue disparity (i.e. natural frequencies of the transfer function that span a large range of frequency, say 10's of Hz to several kHz) is avoided.

To facilitate substantial contribution from the feedforward input, the sense or error microphone is positioned within at least one earcup to be in very close proximity to the ear canal opening of the user when the headset is worn (as close as practically possible considering variations in anatomy without contacting the user). This minimizes the difference between the error microphone and the sound at the ear canal to provide a more accurate measurement of the sound or noise heard by the user.

Positioning the error microphone as described above causes an additional complication in that the differences between each user and even each use/fit are very sensitive to the pinna reflections and ear canal resonance, which would make a traditional fixed filter type of implementation very difficult or cause reduced performance to accommodate different users. Embodiments according to the present disclosure address this problem by adapting or customizing the loop response to each individual. As a result, closed loop performance is improved and, more significantly, feedforward cancelation is substantially improved relative to various prior art ANR devices. A similar method is used in the feedforward cancelation of various disclosed embodiments where the noise transmission transfer function is estimated, and a synthesized transfer function is implemented to provide an anti-noise signal from the driver/speaker. This feature may operate separately, or in combination with the closed loop ANR function.

Embodiments according to the present disclosure may continually monitor ANR operation and selectively update or adapt one or more system variables or parameters, such as the driver-to-microphone transfer function $T_{dm}$ and the noise-to-error-sensing-microphone transfer function $T_{nm}$ for example. System performance can be continually monitored and filters for closed loop and feedforward noise reduction updated during operation as desired to improve noise cancellation. $T_{dm}$ can use communication signals as the stimulus to update the estimate of $T_{dm}$ using a moving average. This method is also useful for correcting variations over time, such as altitude changes for aviation applications and changes in the ear seal caused by perspiration. $T_{nm}$ is technically not noise dependent, but the amplitude and phase vs frequency weighting used to estimate the feedforward filters may incorporate a factor that focuses the accuracy of the feedforward transfer function $T_{ff}(H_{ff})$. Using a weighting that approximates perceived loudness aids in insuring that future updates to these parameters are perceived by the user as improving performance and not just mathematically better based on a lower weighted calculated energy, where the weighting is an approximation of the psycho-acoustic weighting to perceived loudness.

After system characterization, a user can save his personalized response to allow for immediate loading of the personalized response during subsequent use. The saved filters and/or other parameters can be updated during operation to accommodate variations in a particular fit or operating environment.

In addition to using communication signals to adapt one or more system parameters, various embodiments provide customized characterization for a user and/or application using an active stimulus signal, which may more quickly provide the characterization parameters by using a known stimulus signal having desired frequency, amplitude, and phase characteristics. Characterization using an active stimulus may not provide optimal ANR performance for each fit, but will typically be sufficient for good performance, and can adapt (or update the $T_{nam}$ and $T_{dm}$ estimate) by using passive estimates (i.e. using a communications signal for the stimulus and other data when the comm signal is not present to provide data for $T_{nam}$ during subsequent operation).

In various embodiments, $T_{nam}$ estimates can also be updated periodically, and used to monitor performance. If $T_{nam}$ changes significantly, the feedforward filters $T_{ff}$ can be updated from this data. Filters are only updated if the estimated perceived performance is improved. This is done by weighting the estimated change in noise level at the error sensing microphone by the appropriate weighting filter and the spectrum of the noise at the error sensing microphone.

In some embodiments, performance is further improved by the use of two microphones in the ear cavity of the earcups. The second ear cup microphone for error sensing of the closed loop system is optimally positioned to trade off delay from the driver to the closed loop error microphone while providing only enough correlation to the ear to support the closed loop attenuation. This can allow the closed loop attenuation to extend to a higher frequency. The first error sensing microphone is again positioned very close to the ear canal opening, or for applications that will tolerate it, even in the ear cavity opening. In this case, the ear canal error sensing microphone need not be processed as a low latency signal, since it is only used for estimating the pressure at the ear opening.

In other embodiments, the error signal is modified to account for the differences between $T_{dm}$, $T_{de}$, $T_{nm}$, and $T_{ne}$. The goal of the adaptive filter algorithm is then to force the response of the error sensing microphone to a pre-determined function of frequency which reduces or minimizes the noise at the ear drum, as opposed to the adaptive filter attempting to minimize the weighted error.

Various embodiments of an adaptive ANR system or method according to the present disclosure provide associated advantages. For example, typically, ANR headsets only perturb the pinna response slightly, and as with any headphone, the response is influenced by the user's own anatomy, particularly the pinna. The best performing headphones are usually circumaural types that are very leaky, so as to minimize corruption of the users unique pinna response. Embodiments according to the present disclosure significantly reduce or entirely remove any effect of the pinna on sound going into the ear (typically, variations from 2 kHz~20 kHz). By processing the calibration data done on a flat plate or block head with no pinna, and the user's calibration based on an active stimulus or a communication signal, the user's pinna response can be measured and restored. In addition to circumaural headphones, the measured pinna response is valuable for restoring the pinna response to ear bud or in-the-ear type headphones. The restoration of the pinna response as an equalization applied to incoming music signals provides a dramatic improvement over traditional headphone experiences because it is not the result of the pinna and headphone response, but primarily just the pinna response, thus producing an audio response that is very natural, and simultaneously providing very good isolation.

Various embodiments according to the present disclosure allow the noise reduction system to come on in a conservative manner that will be stable for all users, and then measure the key variables, such as $T_{nm}$ and $T_{dm}$, for example, using one or more measurement strategies. When audio is being played to the user, estimates of $T_{dm}$ can be calculated. Use of time averaging of the frequency spectra with a weighting that updates the parts of the $T_{dm}(f)$ that have good excitation greatly improves the speed and accuracy. For example, if very low frequency content or very high frequency content was not present, only the part of the response that was adequately excited is used to improve the estimate of $T_{dm}(f)$. $T_{nm}$ can be estimated ideally without audio. The boom microphone signal provided by headset embodiments can be used to detect if the user is talking, and if this is the case, then the ambient noise is correlated to the communication audio if loop back is present. Also, user speech causes bone conduction that will not be present at the ambient microphone(s), thus it is better to avoid use of measurements when the user is talking. Corrections can be made for communications audio signals if the transfer function is known.

As previously described, various embodiments allow user initiated saving of characterization or calibration data within the headset, or the headset can save the adapted filter coefficients before power down. Alternatively, or in combination, calibration data and/or filter coefficients may be saved and restored from a linked device, such as a cell phone.

In addition to circumaural headphones, various features of the embodiments according to the present disclosure may be used in supra-aural and intra-aural (or in-the-ear) type of headphones.

The above advantages and other advantages and features will be readily apparent to those of ordinary skill in the art based on the following detailed description when read in combination with the accompanying drawings.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In general, the system and method operate by providing customized or adaptive ANR that adapts to each individual user and environment. The basic concept is that the system and method calibrate or adapt the closed loop system to the user and/or fit that reflects the current position of the headset on the user. Compared to traditional methods, this minimizes the effect of unit-to-unit variations caused by manufacturing, user variables, such as pinna shape and size, leak variations due to more or less hair, etc. Additionally, even for the same users, from fit to fit, and over time, variations occur that are caused by hair and perspiration and slight position variations relative to the sensing microphone and the ear opening. As described in greater detail herein, embodiments according to the present disclosure periodically and/or continuously adapt the system parameters to improve the overall ANR performance over varying user fit and ambient conditions to provide a customized ANR experience.

Figure 1C:
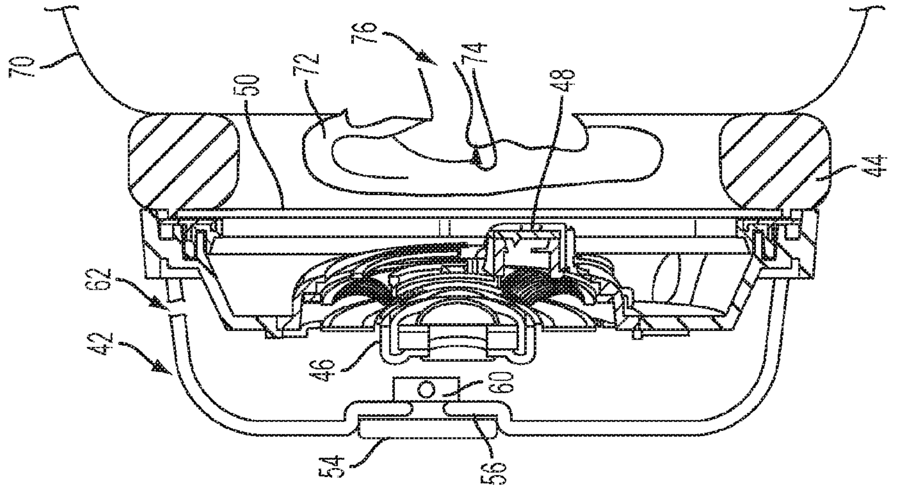
FIGS. 1A-1C illustrate a representative circumaural implementation of a system or method for adaptive ANR according to embodiments of the present disclosure.
Figure 1B:
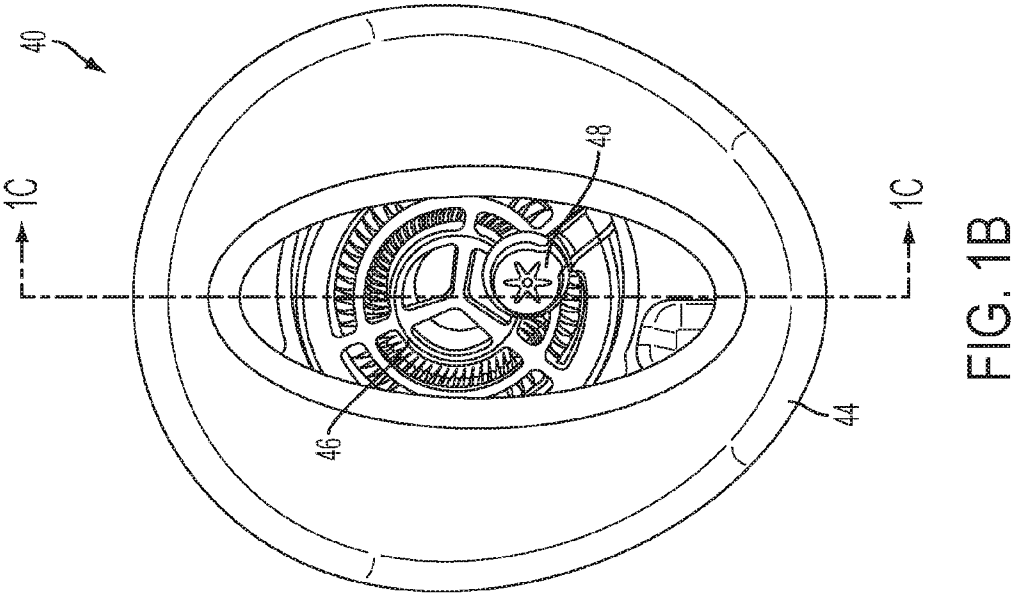
Figure 1A:
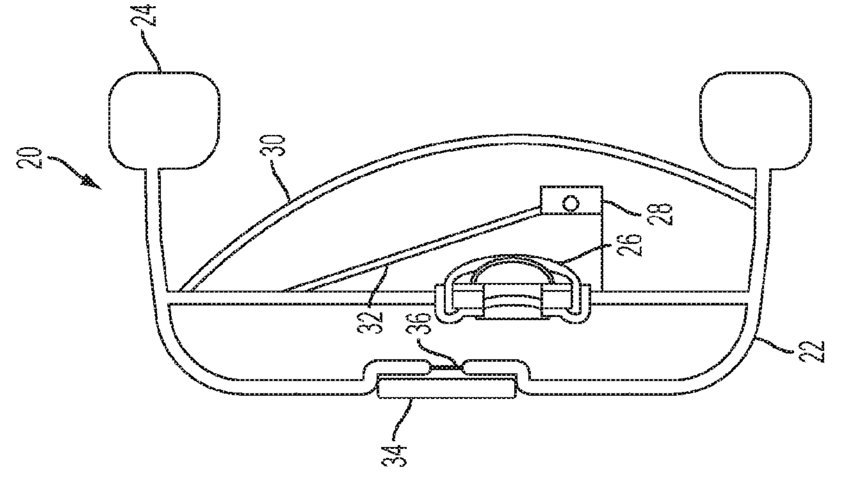
Figure 2:
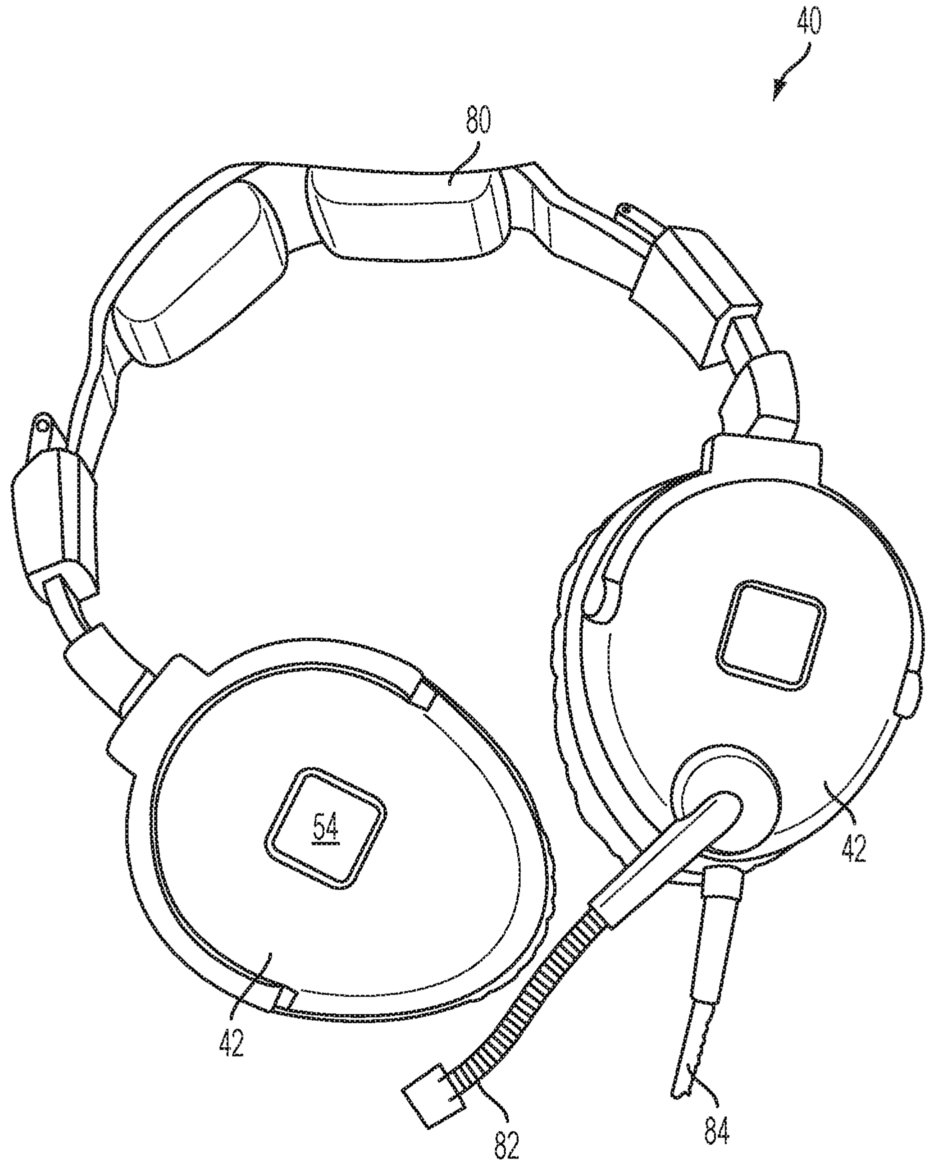
FIG. 2 illustrates a prototype circumaural headset having adaptive ANR according to embodiments of the present disclosure.

FIGS. 1A-1C illustrate a representative circumaural implementation of a system or method for adaptive ANR according to embodiments of the present disclosure. While the representative embodiment is depicted as a circumaural headset with a boom microphone, those of ordinary skill in the art will recognize that strategies of various embodiments may also be used to advantage in other types of headphones, earphones, etc, such as in-the-ear (ITE) and on-the ear (or supra-aural) implementations. FIG. 1A is a diagram representing a cross section of one embodiment illustrating positioning of various system components. ANR headset 20 includes a pair of similarly equipped ear cups 22, only one of which is shown, connected by a band (FIG. 2). Ear cup 22 is used to support a cushion 24 that fits over and surrounds the pinna of the ear of a user during use. Cushion 24 is partially compressed to provide a seal around the ear. Ear cup 22 supports a driver or speaker 26 as well as an ANR or error microphone 28. Acoustically "open" cloth or foam 30 covers driver 26 and error microphone 28. A second layer 32 of foam or cloth that is more acoustically dense may be provided to cover at least a portion of the driver 26, but does not cover error microphone 28 in this embodiment. Second layer 32 may also be implemented as a portion of cloth or foam 32. Ear cup 22 may include one or more vents that may be covered by a cover plate 34 and damping material such as foam 36.

FIGS. 1B and 1C illustrate an alternative embodiment that is similar to the embodiment of FIG. 1A, but includes a second ANR or error microphone to detect ambient noise. As illustrated in the inside view of FIG. 1B and cross-section of FIG. 1C, system 40 includes an ear cup 42 having a cushion 44 that partially compresses against the head 70 of a user during operation. The pinna 72 and tragus 74 of the user's ear extends within the portion of ear cup 42 in front of acoustic fabric 50. Driver or speaker 46 is positioned within ear cup 42 generally behind sense microphone 48, which is positioned near the opening of ear canal 76 and tragus 74 of user 70. An optional second sense or error microphone 60 is used to detect ambient noise and provide a corresponding signal to the ANR processing circuitry to improve performance based on current operating conditions. In this embodiment, ambient noise microphone 60 is positioned behind a corresponding opening in ear cup 42 and covered by a rigid cover plate 54 and layer of foam 56 or similar material. Ear cup 42 may also include a vent 62 sized to provide desired response of driver 46.

As illustrated in FIGS. 1B-1C, the sense microphone 48 is as close to the tragus 74 of the user 70 as possible. (i.e. over the population, any closer may start to cause comfort issues). The path distance (string length) from the driver 46 to the microphone 48 is greater than the string length from the microphone 48 to the tragus 74 of user 70. Closeness to the ear opening is believed to be more important than distance from the driver 46 in this embodiment. This would be very problematic in a conventional system that does not adapt to variation associated with fit and anatomy as different shapes and sizes of pinnas can otherwise cause significant variation in the 1 kHz~3 kHz regions that adversely affect closed loop stability.

The close proximity of the sense microphone 48 to the ear opening 76 allows the microphone to match the ear so that cancelation can be up to 20 dB out to 2 kHz and much more at lower frequencies as generally demonstrated by the graphs of FIGS. 9-19.

FIG. 2 illustrates a prototype circumaural headset having adaptive ANR according to embodiments of the present disclosure. The perspective view of FIG. 2 illustrates a headset 40 having ear cups 42 connected by a head band 80. A boom microphone 82 extends from one of the ear cups 42 and is used to capture user speech. Headset 40 may be coupled to a signal source by a corresponding cord or cable 84, or may be wireless connected in some implementations.

Figure 3:
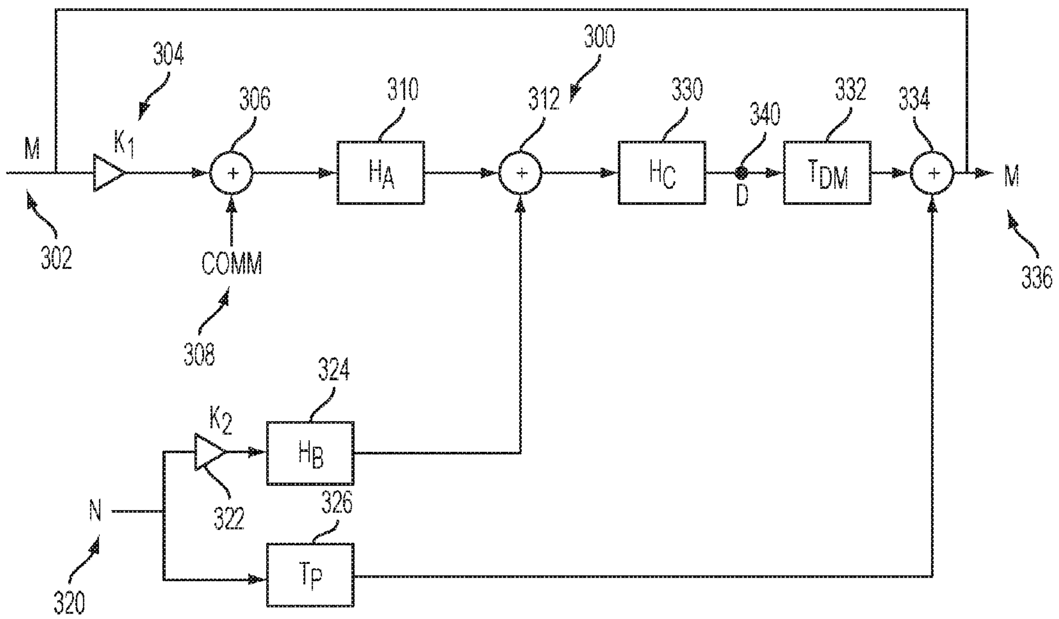
FIG. 3 is a simplified control system block diagram and supporting equations used to determine various transfer functions associated with an adaptive ANR system or method according to embodiments of the present disclosure.

FIG. 3 is a simplified control system block diagram and supporting equations used to determine various transfer functions associated with an adaptive ANR system or method and to illustrate operation of a system or method for adaptive ANR according to embodiments of the present disclosure. The control system block diagram of FIG. 3 may be used to derive a target feed forward response ($H_B$) that would provide total noise cancellation in an idealized system. The block diagram of FIG. 3 includes an input for a signal from an ambient noise microphone, although those of ordinary skill in the art will recognize that the same principles may be applied to systems that do not include an ambient noise microphone or associated signal.

In contrast to prior art ANR strategies, embodiments of the present disclosure estimate transfer functions to do the noise cancelation. Previous strategies rely on methods that depend on the statistics of the noise. i.e. they cancel the periodic components of the noise. In the method and system according to the present disclosure, an adaptive realizable filter is used, specifically, an IIR filter rather than a FIR filter, with the end result that the performance measured as attenuation vs frequency is totally independent of the statistics of the noise. (i.e. periodic methods don't work well if the noise is not periodic.)

As shown in FIG. 3, the sense microphone signal M 302 is multiplied by a linear factor $K_1$ at 304 and combined at block 306 with the communication (comm) signal 308. The combined signal is processed by the target response $H_A$ at block 310 and combined at block 312 with the processed signal associated with the noise signal N represented at 320. Noise signal N is multiplied by a constant $K_2$ as indicated at 322 and the target feed forward response $H_B$ at block 324 before being combined as described above at block 312. Noise signal N at 320 is multiplied by $T_p$ at block 326 with the result provided to block 334. The output of block 312 is multiplied by $H_C$ at 330 and $T_{dm}$ at 332 before being combined at 334 with the output from block 326 to generate output M at 336, which represents the error or sense microphone signal used in the feedback loop. Block 332 represents the response or transfer function between the driver D at 340 and the sense microphone M at 336.

Those of ordinary skill in the art will recognize that measuring the driver to error or sense microphone response between the driver/speaker 46 and sense microphone 48 represented by $T_{dm}$ in use is ideal, and can be done actively or passively. For active measurement of $T_{dm}$ according to various embodiments of the present disclosure, a test signal is used as the stimulus. This can be any signal that excites the modes of the system. For example, a multitone, chirp, log chirp, or random noise are some examples of a possible test signal or active stimulus. A test signal that is periodic about a value n, where n represents the FFT size eliminates the need for a window function. Of course, an FFT is just one basis and the representative methods illustrated will work independently of the basis chosen for solving the problem. Other adaptive strategies that minimize the error by a gradient search may also be used, such as a least mean squares (LMS) or root mean squares (RMS) optimization, for example.

The response or transfer function $T_{dm}$ of block 332 can also be measured passively, but using normally occurring signals such as the speech or aircraft noise. If only aircraft noise is used, the system closed loop response can be perturbed to allow the simultaneous estimation of both $T_{dm}$ and $T_p$. Otherwise, there is only one equation and two unknowns. To provide a solution, for the two unknowns requires another equation, i.e. the system is perturbed (the loop gain of the closed loop filters is changed slightly so that two equations are created. During the process the system performance is perturbed for the purpose of determining the two parameters related to the driver to mic response ($T_{dm}$) and the noise to mic response ($T_p$) unknowns.

The following control equations may be derived from the block diagram illustrated in FIG. 3:

$$\frac{M}{N} = \frac{T_p + K_2 H_B H_C T_{DM}}{1 - K_1 H_A H_C T_{DM}} + \frac{H_{AH_C T_{DM}}}{1 - K_1 H_A H_C T_{DM}} \cdot \frac{comm}{N} \tag{1}$$

$$\min \left\| \frac{M - \frac{H_A H_C T_{DM}}{1 - K_1 H_A H_C T_{DM}} \cdot comm + \in}{N} \right\|^2 \tag{2}$$

$$\therefore \min \| T_p + K_2 H_B H_c T_{DM} \|^2 \tag{3}$$

$$\frac{\delta \| T_p + K_2 H_B H_c T_{DM} \|^2}{\delta H_B} = 0 \tag{4}$$

$$T_p + K_2 H_B H_C T_{DM} = 0 \tag{5}$$

$$H_B = -\frac{1}{K_2} T_p / H_C T_{DM} \tag{6}$$

$$D \cdot T_{DM} + N \cdot T_p = M \Rightarrow T_p = \frac{(M - DT_{DM})}{N} \tag{7}$$

$$H_B = -\frac{1}{K_2}(M - DT_{DM}) / N \cdot H_C T_{DM} \tag{8}$$

$$= -\frac{1}{K_2}\left(\frac{T_{nam}}{H_C T_{DM}} - \frac{T_{nDm}}{H_C}\right) \tag{9}$$

$$T_{nam} = \frac{M \cdot N^*}{N \cdot N^*} \tag{10}$$

$$T_{nDm} = \frac{D \cdot N^*}{N \cdot N^*} \tag{11}$$

Where the following variable definitions are used in the representative embodiment illustrated in the Figures and mathematically represented above:

M represents the sense/error microphone;

N represents the ambient noise measured by the ambient microphone (60, FIG. 1C);

$T_p$ represents passive attenuation corresponding to M/N with no active or comm signal present;

$T_{nam}$ represents active attenuation at the sense microphone corresponding to measured M/N with no comm signal present; and $T_{dm}$ represents the driver to error mic response.

The system design allows for the sense/error microphone 48 to be placed much closer to the ear opening than previous implementations. This has the key advantage of being a more accurate estimate of what the user actually hears. i.e. there will be smaller differences in $T_{dm}$ and $T_{de}$, and in $T_{nm}$ and $T_{ne}$.

The system uses a feedforward method that includes a feedback loop. For closed loop feedback operation, the signal from the error microphone M is fed back into the system to reduce noise as generally represented in FIG. 3 with output 336 and input 302. In the feedforward mode, the error microphone, which is positioned as close as possible to the ear opening and much closer than in conventional ANR applications, more accurately represents audio heard by the user. This signal is used to monitor performance and continuously update the transfer function of the feedforward filter $H_B$ as shown in the block diagrams illustrated and described in greater detail herein.

Figure 4:
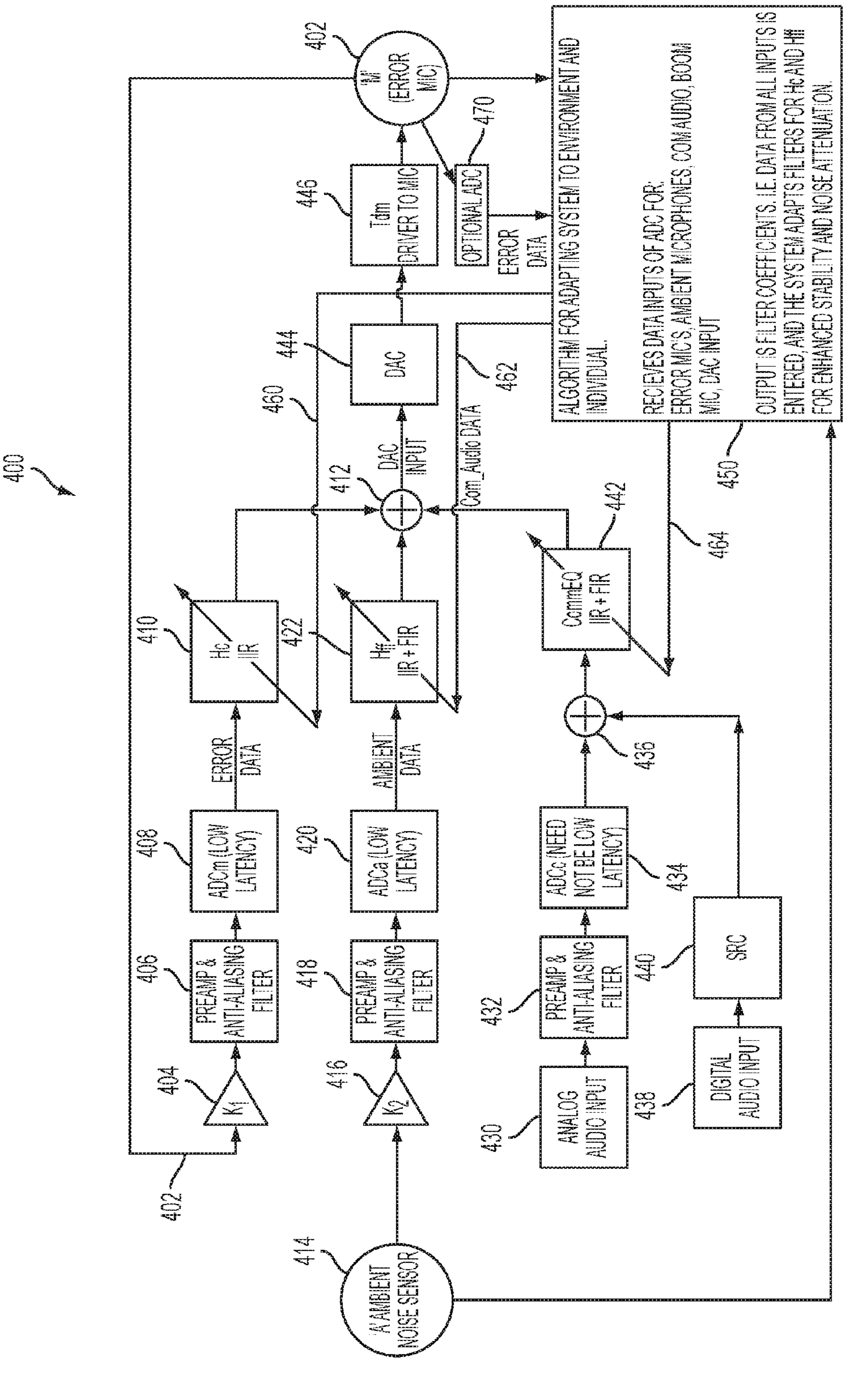
FIG. 4 is a conceptual block diagram illustrating various functional blocks for adaptive ANR including sense microphones, drivers, and external inputs according to embodiments of the present disclosure.

FIG. 4 is a conceptual block diagram illustrating various functional blocks for adaptive ANR including sense microphones, drivers, and external inputs according to embodiments of the present disclosure. The block diagram of FIG. 4 provides a more detailed representation of the adaptive ANR strategy generally illustrated in the block diagram of FIG. 3. System 400 provides the sense or error microphone signal 402 as feedback, which is multiplied by a constant $K_1$ at block 404 with the output provided to preamp and anti-aliasing filter 406. A low latency analog-to-digital (ADC) converter 408 processes the signal to provide error data to adaptive feedback filter $H_C$ at 410. As used in this application, and as described in greater detail below, a low latency ADC (or DAC) generally refers to a successive approximation converter with successive approximation registers that has virtually no delay and that does not include sigma-delta converters that use linear filters. Oversampling, or sigma-delta type converters, are not necessarily inappropriate for this type of low latency application, but both ADC's and DAC's of this type require a filter to average and provide the required resolution, which is typically done with a low pass filter/decimation filter. While these converters are typically linear phase converters that minimize phase distortion, this is accomplished at the expense of latency and provides less than desirable results in an adaptive ANR application such as disclosed herein.

Adaptive feedback filter 410 is an IIR (infinite impulse response) filter that is equivalent to a combination of the HA filter or target response 310 and HC filter 330 illustrated in FIG. 3. The coefficients of adaptive feedback filter 410 may be provided by an adaptation algorithm as generally represented by block 450. Alternatively, filter 410 may use predetermined coefficients determined during product development rather than adaptive coefficients determined in response to current operating environment and user fit. The output of filter 410 is then combined at 412 with the processed ambient noise signal and digital and audio noise signals.

An ambient noise signal 414 is multiplied by an associated constant $K_2$ at block 416. Ambient noise signal 414 may be generated by a corresponding ambient noise microphone, such as microphone 60 (FIG. 1C). The result is provided to preamp and anti-aliasing filter 418 with the output of block 418 provided to a low latency ADC 420 to provide ambient noise data to adaptive feed forward filter $H_{FF}$ 422. Adaptive filter 422 has one or more filter coefficients adaptively determined by an associated adaptation algorithm 450. Adaptive filter 422 includes aspects of both an IIR and FIR filter as it is a function of filters or target responses $H_A$ 310, $H_B$ 324, $H_C$ 330, and TDM 332 as illustrated and described with reference to FIG. 3. The output of adaptive filter 422 is then combined at 412 with the outputs of adaptive feedback filter 410 and adaptive filter 442.

Analog audio input 430, such as input from a boom microphone or an external analog audio device coupled to the headset is provided to preamp and anti-aliasing filter 432 with the output of filter 432 provided to ADC 434. As illustrated, while a low latency ADC is suitable, it is not needed to provide desired system performance for processing of the analog audio input 430. The output of ADC 434 is combined at 436 with external digital audio input 438 after processing by SRC at 440, which provides stereo cross-feed to more accurately represent stereo signals. The combined signal/data is provided to adaptive filter (CommEQ) at 442, with filter coefficients determined by adaptation algorithm 450. Adaptive filter 442 combines features of an IIR and FIR filter.

The combined signal from block 412 is provided to digital-to-analog converter (DAC) 444. The output of DAC 444 is then provided to block 446, representing the response $T_{DM}$ from the driver to the error/sense microphone, with the output representing the error signal 402.

As described above, an adaption algorithm 450 provides coefficients to adaptive filters 410, 422, and 442 as generally represented at 460, 462, and 464, respectively. Adaptation algorithm 450 may be implemented in software and/or hardware. In the representative embodiments illustrated, adaptation algorithm 450 is implemented by software using a programmed microprocessor that receives data error input from ADC 408, ambient data input from ADC 420 and external audio input data from ADC 434 and SRC 440. Adaptation algorithm 450 may also receive ambient input from an optional ADC 470 used only during the adaptation process. The input data is used to generate filter coefficients for filter 410 and 422 for enhanced stability and noise attenuation.

Various embodiments according to the present disclosure automatically determine the adaptive filter coefficients in response to current operating conditions. According to these embodiments, the adaptation algorithm calculates filter coefficients using only two categories of data corresponding to data representing audio signals without an active stimulus and communication signal from the system panel, and data representing audio signals with either active stimulus or communication from the system panel (or other external source generating audio signals through the driver). In one embodiment, the system uses data generated in response to the active stimulus, and data generated in response to ambient noise with no active stimulus and no external audio signal present for the driver.

Because the system estimates both $T_{DM}$ and either $T_P$ (or alternatively $T_{nam}$) across the desired frequency range, there are two unknowns at each frequency. $T_{DM}$ for example can be estimated very well if no noise is present, or if $T_{nam}$ is known. Alternatively, $T_{nam}$ can be estimated if $T_{DM}$ is known. This is basically solving for two unknowns (at each frequency) with two equations. However, if the data represents two samples at different times, differing only by random measurement errors, but nothing is substantially different, the system cannot solve for two unknowns. As such, the system uses the calibration data (active stimulus) for one equation, and a moving average of subsequent data representing ambient noise without an external audio signal from the panel or a connected device to provide the second equation. A best fit strategy or technique is then used with equal weighting for each data type. Alternatively, the best fit strategy can use unequal weighting, but should be controlled so that it does not minimize the data generated in response to the active stimulus.

As recognized by the present inventor, it is possible to estimate the responses using data generated while the user is speaking. However, this data may not provide the desired results because it is affected by bone conduction and the ambient estimate will be biased toward a noise source of the user talking. If the system excludes this operating condition, then it can obtain the necessary equations from data generated with an external communication signal (comm data) present, and no external communication signal present, to estimate the feedforward transfer function, which is based on $T_{DM}$ and $T_{nam}$. As such, in one representative embodiment, the system detects a signal from the boom microphone indicative of user generated audio signals and avoids using data generated during these events in the adaptation algorithm to adjust or adapt the coefficients of the feedforward filter. Likewise, the system detects an external audio signal, such as a comm signal from a panel input or another coupled device, and the adaptation algorithm does not use data generated during these events to adjust or adapt the coefficients of the feedforward filter.

In contrast to prior art ANR strategies, embodiments of the present disclosure estimate transfer functions to perform noise cancelation. Previous strategies rely on methods that depend on the statistics of the noise, i.e. canceling the periodic components of the noise. In the method and system according to the present disclosure, an adaptive realizable filter is used, which incorporates an IIR filter specifically, rather than relying solely on a FIR filter, with the end result that the performance measured as attenuation over a range of frequencies is independent of the statistics of the noise. (i.e. periodic methods don't work well if the noise is not periodic.)

As described in greater detail herein, data measurement is performed by block 450 as needed to provide data for adapting filters. In addition, stereo cross-feed processing may be performed here to enhance audio performance. Measurement data from the sensors and audio inputs may be used to estimate transfer functions that have the unknowns $T_{DM}$ and $T_{NM}$ as generally illustrated and described with reference to FIG. 3. These estimates are then used to generate filters having associated coefficients that compensate for the transfer functions. $T_{DM}$ and the variations caused by individual user's pinnas can be compensated for to enhance the closed loop performance and/or to estimate the feedforward transfer function $T_{FF}$ along with the noise attenuation transfer function $T_{NM}$. The net total attenuation is a function of all system parameters and $H_B$ or $H_{FF}$ is then solved in terms of the estimated parameters and known parameters such as the digital filters for closed loop functioning.

Figure 5:
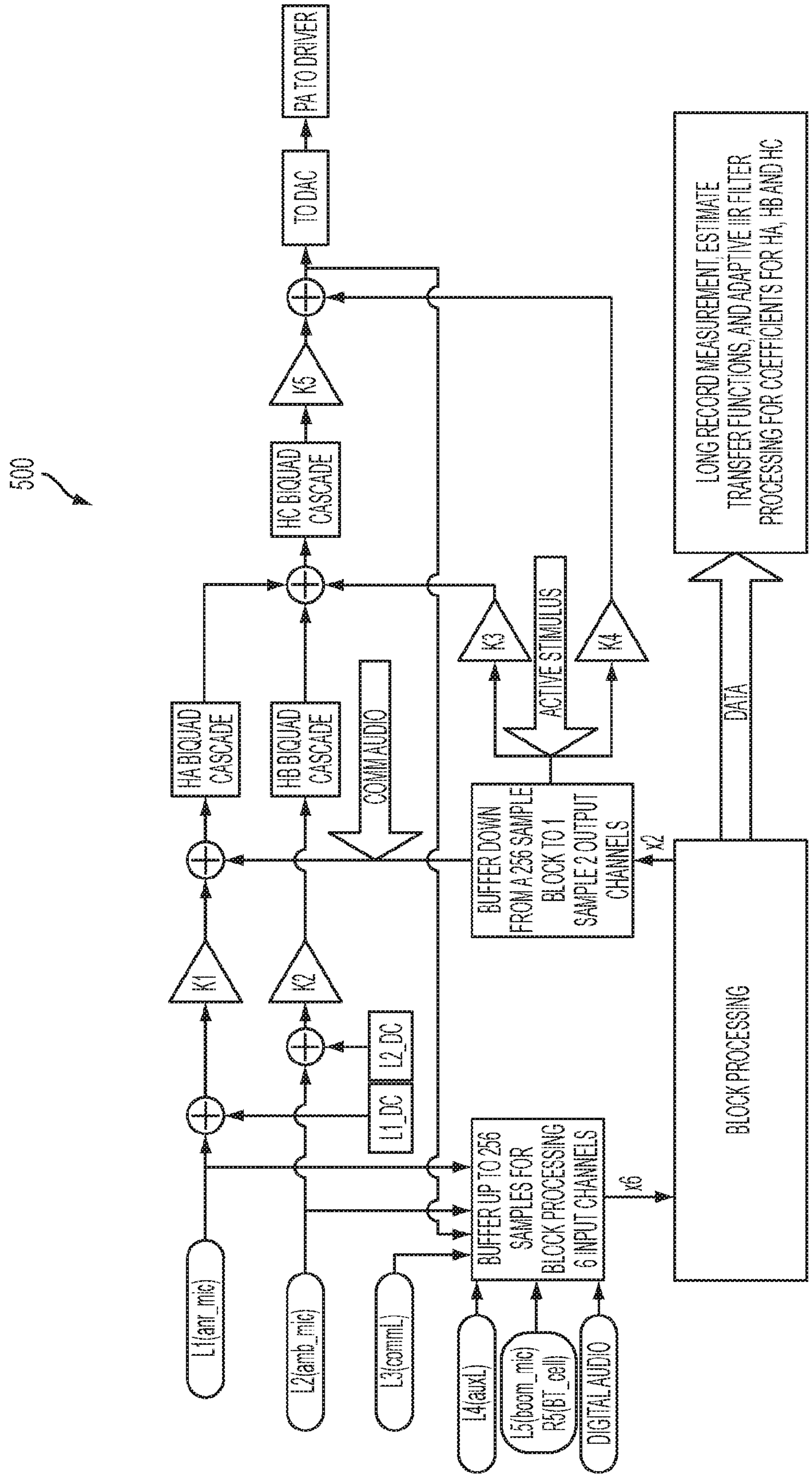
FIG. 5 is a block diagram illustrating sample-by-sample (SBS) low latency processing and adaptive filter coefficient calculator for adaptive ANR according to embodiments of the present disclosure.
Figure 6:
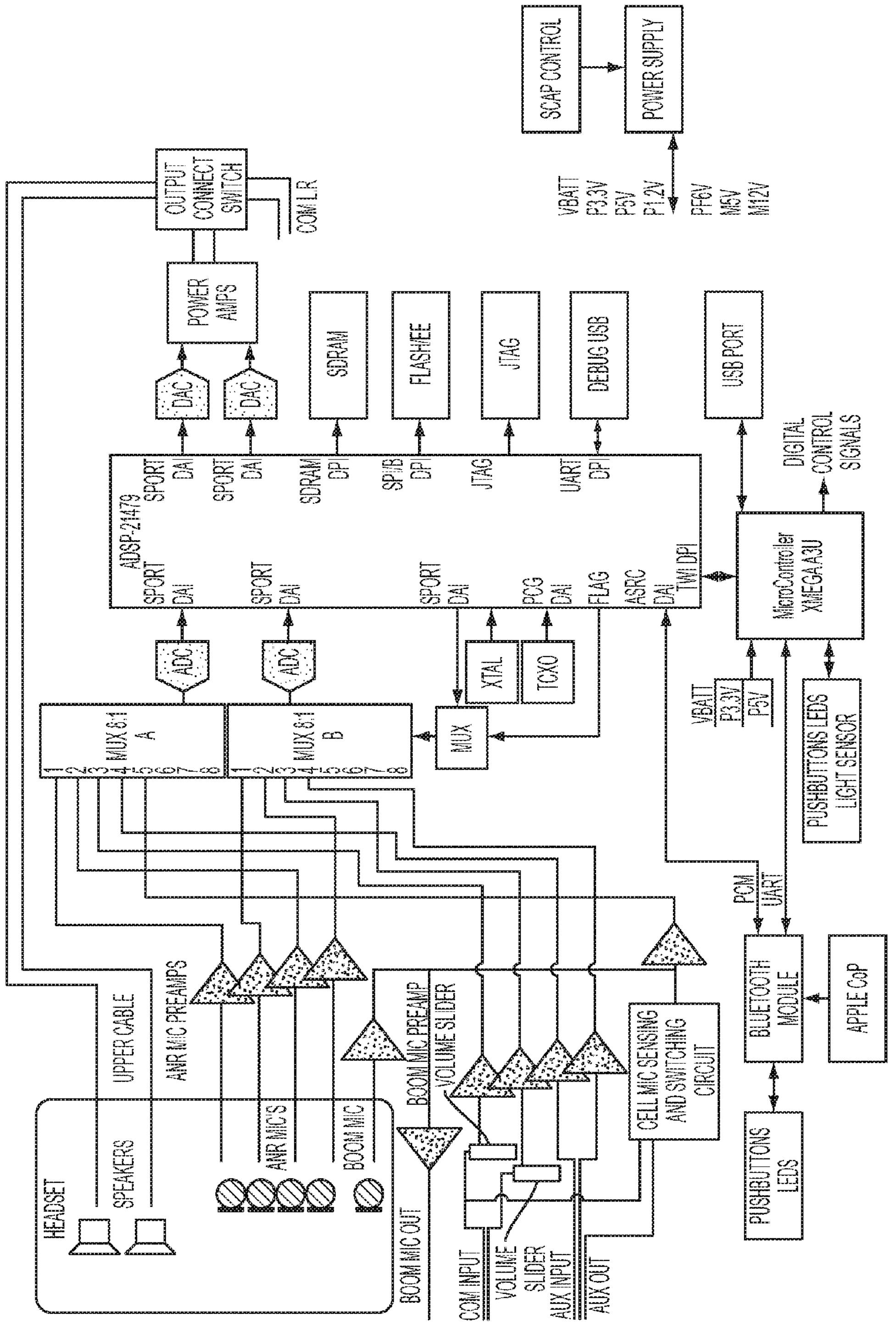
FIG. 6 is a block diagram illustrating system architecture for a representative embodiment of an adaptive ANR headset according to the present disclosure.
Figure 7A:
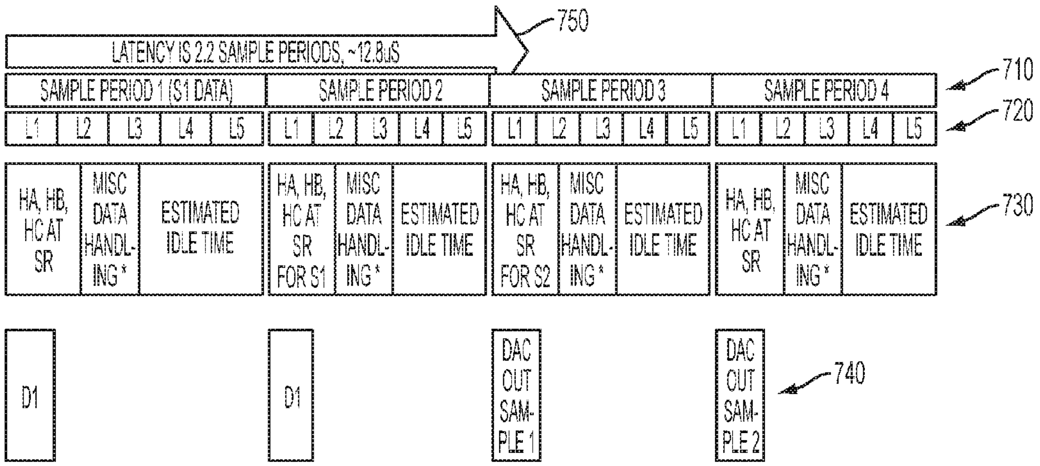
FIG. 7A PRIOR ART
FIGS. 7A (Prior Art) and 7B illustrate improved low latency audio processing for adaptive ANR according to representative embodiments of the present disclosure.

FIG. 5 is a block diagram illustrating sample-by-sample (SBS) low latency processing and an adaptation algorithm strategy for use in adaptive filter coefficient calculations for adaptive ANR according to embodiments of the present disclosure. FIG. 6 is a block diagram illustrating system architecture for a representative embodiment of an adaptive ANR headset according to the present disclosure. FIGS. 7A (prior art) and 7B illustrate representative low latency audio processing for adaptive ANR according to representative embodiments of the present disclosure. An ANR headset according to embodiments of the present disclosure incorporates successive approximation register (SAR) converters and low latency DAC's as previously described and illustrated to provide desired system performance. In addition, the system processes the sampled data using a unique low latency strategy in contrast to conventional digital data processing techniques.

Figure 7B:
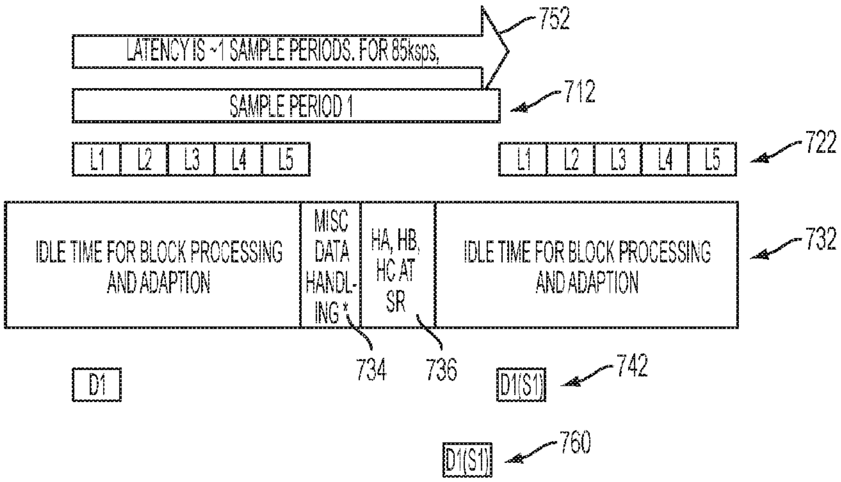

FIGS. 7A and 7B provide timing diagrams illustrating processing of sampled signals acquired during particular sample time periods for sequentially sampled channels. A representative prior art digital audio processing strategy is illustrated in FIG. 7A. Sequential sampling periods are represented at 710 with multiplexed ADC input channels L1-L5 represented at 720. In the representative embodiment illustrated, five (5) channels are sampled with L1 having ANR/error microphone data, L2 having ambient microphone data, L3 having comm channel data, L4 having auxiliary input channel data, and L5 having boom microphone data. The processing task timing of the digital signal processor (DSP) is represented at 730 and the DAC output is represented at 740. Arrow 750 generally represents the lowest possible latency for a signal on any of the multiplexed inputs to propagate to the DAC (or power amplifier and associated driver/speaker). The sampling rate in this example is 170 ksps in this case. Arrow 750 represents the latency corresponding to two sample periods plus whatever propagation time is required for the DAC to load. In many audio DSP systems, the DAC is actually loaded at the end of the third sample period.

FIG. 7B illustrates an improved low latency processing strategy incorporated into various embodiments of the present disclosure. In FIG. 7B, the ADC samples represented at 722 are acquired during a first sample period represented at 712 and are used to calculate the filter coefficients for $H_A$, $H_B$, $H_C$ as represented at 732 and output to the DAC as represented at 742 (or 760 for an ideal DAC). The resulting latency of this strategy corresponds to one sample period as represented by arrow 752 for an ideal DAC as represented at 760, and slightly longer than one sample period accounting for group delays, which include loading delays of a representative DAC as represented at 742.

As such, the representative prior art digital signal processing technique illustrated in FIG. 7A, samples data during sample period (n), processes previously sampled data from sample period (n−1), and outputs previously processed data from sample period (n−2), requiring approximately 2.2 sample periods or about 12.8 microseconds accounting for loading of the DAC. In contrast, as generally illustrated in FIGS. 5, 6, and 7B, embodiments according to the present disclosure sample data during sample period (n), and process and output the data (for sample period n) during the same sample period (n) to reduce latency to approximately one sample period in this example, or just over one sample period when accounting for loading delay of the DAC. Stated differently, the data from one or both of the ANR or sense microphones is sampled, filtered, and output to the DAC before the next sample period. As such, for low latency as used herein, the system latency should be such that the DAC output can be influenced by ADC inputs in less than 2 sample periods.

As illustrated in the representative embodiment of FIG. 7B, data processing does not begin at 734 (misc. data handling) and 736 (computations for $H_A$, $H_B$, and $H_C$) until all five (5) channels are sampled. In another embodiment, latency is further reduced by starting processing of one channel before all the channels have been sampled. For example, processing may start on the channel carrying ANR sense microphone data for calculation of the coefficients of $H_A$ as soon as the data is ready. This introduces aliasing and therefore requires anti-aliasing filters for best performance. However, because the human ear is not sensitive to frequencies beyond about 20 kHz, the anti-aliasing band stop can be set to 20 kHz below the sampling rate. For example, in the case of an 85 kHz sampling rate, the band stop of the anti-aliasing filter can be set to 65 kHz corresponding to (85 kHz-20 kHz). While this results in frequencies above ½ of the sampling rate and below the stop band being aliased, corresponding to 85 kHz/2 (or 42.5 kHz) to 65 kHz, these frequencies will not be audible to the human ear and will not affect perceptible performance. The higher anti-aliasing stop band is advantageous because it allows the associated pass band of the filter to be higher and thus have much lower group delay in the audible range.

The audio processing for active noise reduction is performed in real time by a digital signal processor, such as shown in the system architecture block diagram illustrated in FIG. 6. However, the filter adaptation described in detail with respect to FIGS. 4, 5, and 7A-7B, for example, does not need to be performed in real time. Filter adaptation may be performed when the system performance has changed due to a change in operating conditions, such as altitude, fit, or other possible time varying parameters including the ambient noise characteristics. Alternatively, filter adaptation may be continuously performed to detect changes in operating conditions by comparing calculated filter coefficients with current (or preceding) filter coefficients. The new filter coefficients may be used in response to detecting that operating conditions have changed significantly. As previously described, filter coefficients may be temporarily stored in persistent memory for subsequent recall to reduce time associated with adaptation. Of course, previously stored filter coefficients may not be particularly suited for current operating conditions or fit.

Figure 8:
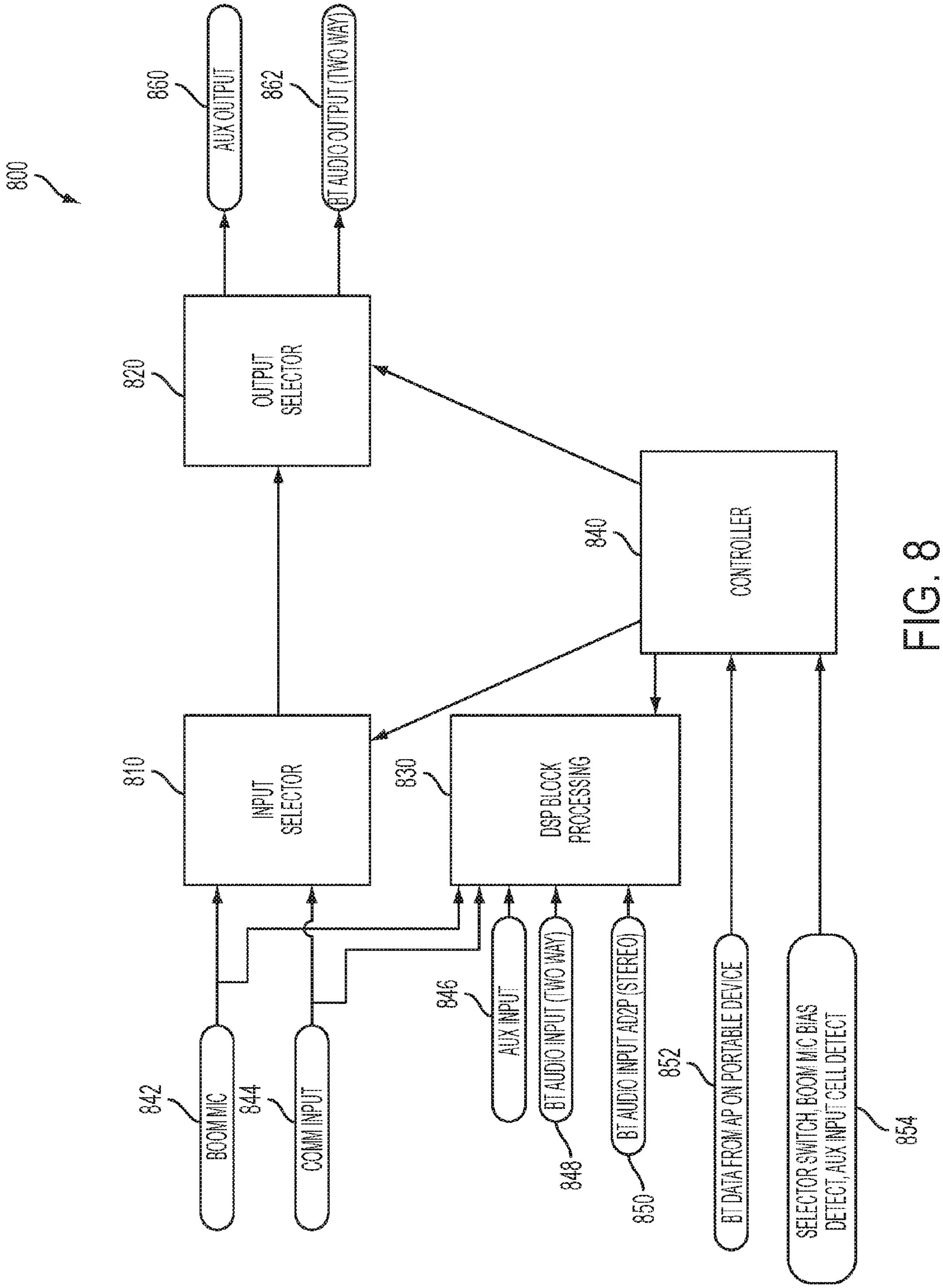
FIG. 8 is a block diagram illustrating integration and configurability details provided by a linked device or other user interface for an adaptive ANR system or method according to various embodiments of the present disclosure.

FIG. 8 is a block diagram illustrating integration and configurability details provided by a linked device or other user interface for an adaptive ANR system or method according to various embodiments of the present disclosure. As described in greater detail below, personal preferences can be set using the enhanced capability of a linked device, such as a smart phone. Bass and treble levels of the intercom and auxiliary inputs can be adjusted independently and separate intercom priority options can be set for Bluetooth and wired input. The voice clarity option boosts frequencies common to human speech without impacting the quality of music from auxiliary devices.

As shown in FIG. 8, system 800 includes an input selector module 810, an output selector module 820, and a DSP block processing module 830 in communication with a controller 840, which also communicates with Bluetooth (BT) data port 852 and Selector Switch Input port 854. Input selector 810 communicates with wired input ports including a boom microphone port 842, a communications (Comm) input port 844, and an auxiliary (Aux) input port 846. Output selector module 820 communicates with an auxiliary (Aux) output port 860 and a Bluetooth (BT) audio output port 862. DSP module 830 communicates with ports 842, 844, and 846 in addition to a first BT audio input port 848 and a second audio input port 850, which is configured for AD2P stereo input in the representative embodiment illustrated.

In the representative embodiment of FIG. 8, the routing of either the boom microphone signal/port 842, or the comm input port 844 is directed to the appropriate output port 860, 862 by output selector 820 and may be specified manually by the user or determined automatically by the system via controller 840. The output selector 820 directs output to the wired auxiliary output port 860 or to the wireless Bluetooth (BT) audio output port 862. This allows an app running on a connected portable device (such as a smart phone or tablet, for example) to operate as the user interface to the ANR headset to adjust personalization settings and/or headset performance. Voice commands processed by a linked portable device can be communicated to the controller 840 of the headset via the BT data port 852. Similarly, voice commands captured by the boom microphone applied to port 842 can be sent to a linked device for processing via output ports 860 or 862. The boom microphone signal on port 842 may be manually or automatically routed to the desired output depending on how the linked device is coupled to the headset (wired, wireless, analog, or digital). For example, the controller may automatically connect (route) the boom microphone input port 842 via input selector 810 and output selector 820 to a coupled cell phone in response to detecting a phone call or dialing command as determined by controller 840. For a cell phone linked by the Bluetooth modules 848 and 852, the controller module 840 would connect the boom microphone port 842 to the BT audio output port 862, whereas for a cell phone linked by the auxiliary input port 846, the controller module 840 would connect (route) the boom microphone port 842 to the auxiliary output port 860 via controls or commands communicated to input selector 810 and output selector 820, respectively. A connected device may also communicate personalization commands to controller 840 to control headset features such as personal preference for tone or performance of the noise reduction system (update rate, saved personalization settings, etc.).

FIGS. 9-19 are graphs illustrating improved ANR performance for an adaptive ANR system or method according to embodiments of the present disclosure.

Figure 9:
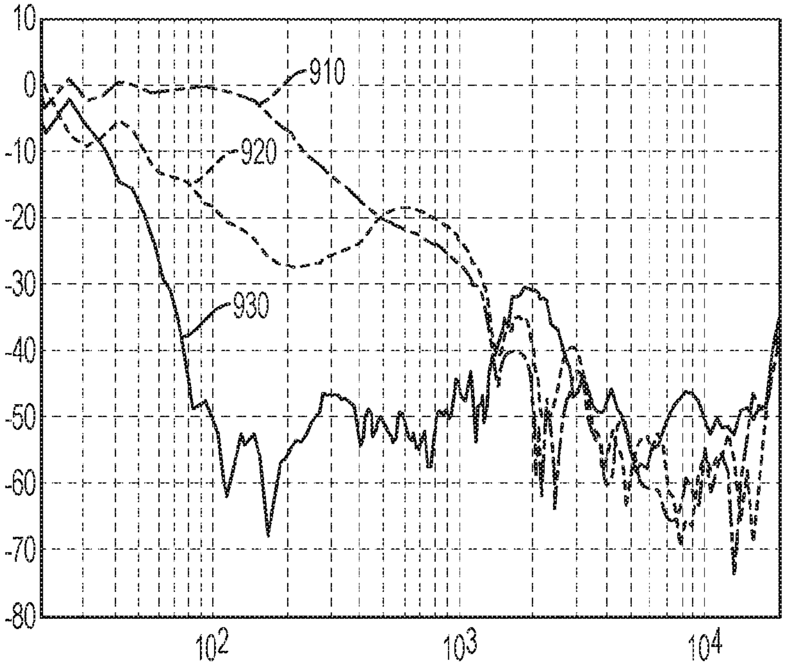
FIGS. 9-19 are graphs illustrating improved ANR performance for an adaptive ANR system or method according to embodiments of the present disclosure.
Figure 10:
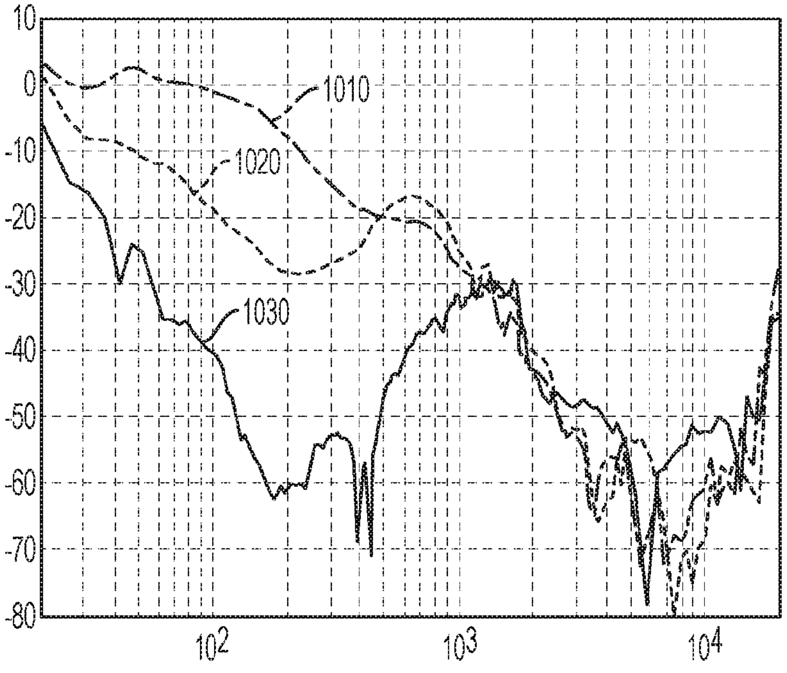

FIGS. 9 and 10 are graphs illustrating noise attenuation performance of representative embodiments according to the present disclosure for first and second noise inputs, respectively. Lines 910, 1010 represent passive attenuation, lines 920, 1020 represent closed loop attenuation without feedforward, and lines 930, 1030 represent noise attenuation performance with both feedforward and closed loop feedback.

Figure 11:
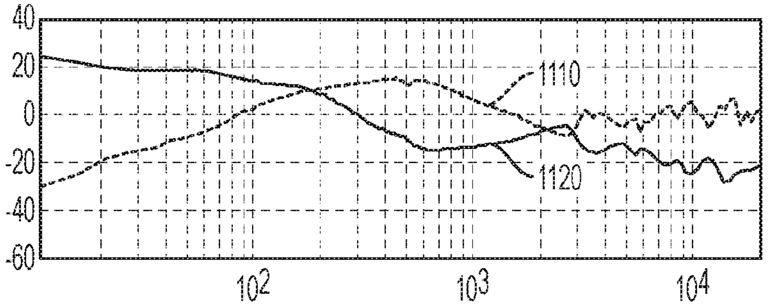
Figure 12:
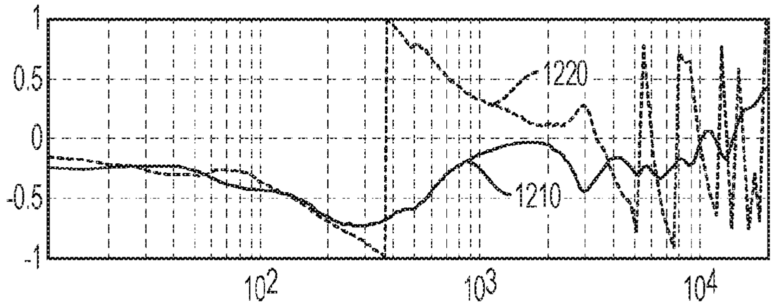

FIGS. 11 and 12 illustrate amplitude and phase response, respectively, as a function of frequency for a measured response of the driver to error microphone transfer function on a user 1110, 1210 and realized adaptive correction filter $H_C$ 1210, 1220.

Figure 13:
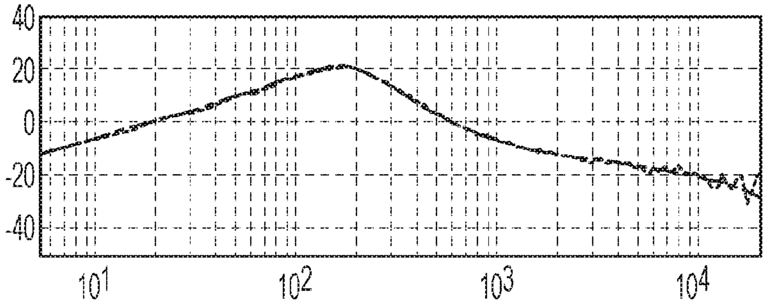
Figure 14:
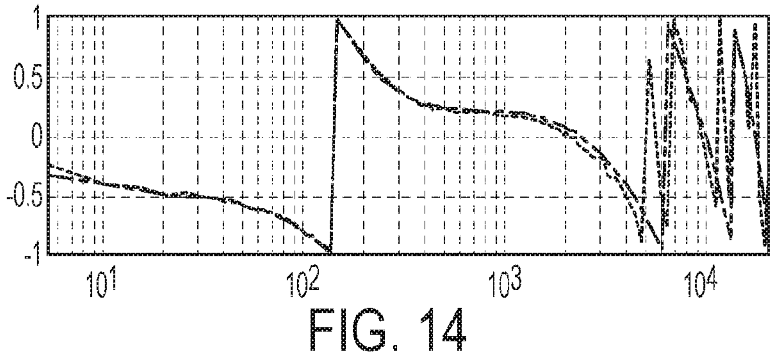

FIGS. 13 and 14 illustrate amplitude and phase response, respectively, of $T_{DM}$*$H_C$ as a function of the target open loop response for closed loop noise reduction.

Figure 15:
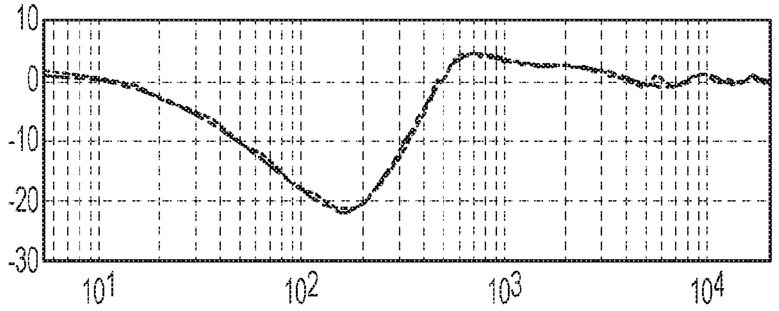
Figure 16:
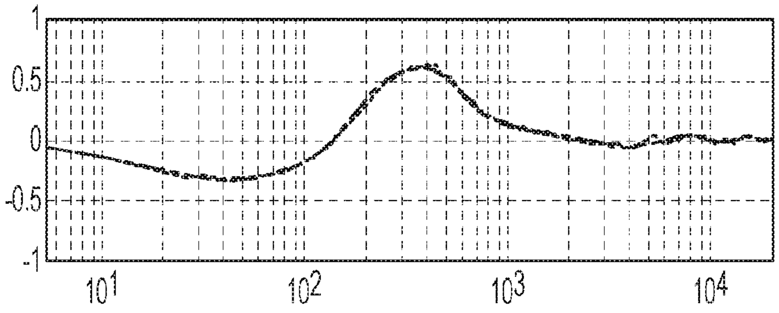

FIGS. 15 and 16 illustrate amplitude and phase response, respectively, of $T_{DM}$*$H_C$ as a function of the target closed loop response for closed loop noise reduction.

Figure 17:
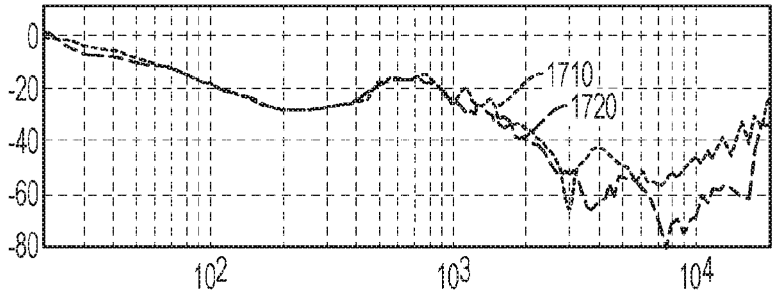
Figure 18:
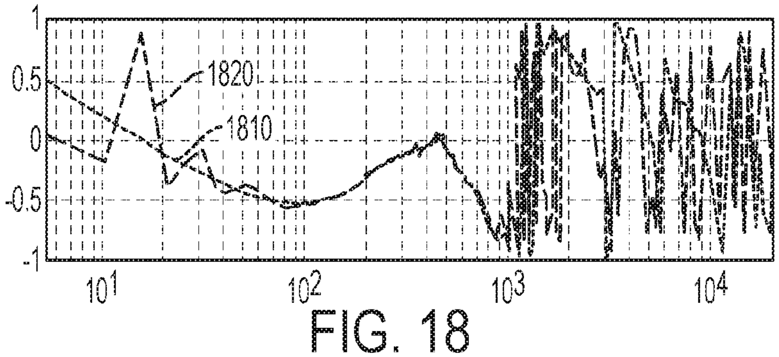

FIGS. 17 and 18 illustrate a representative measured attenuation transfer function 1710, 1810 (error mic noise/ambient noise) and calculated/realized $T_{ff}$ 1720, 1820 for adaptive feedforward (note that $T_{ff}$ is plotted as $-T_{ff}$ since cancelation is the goal). It would not be possible to achieve this level of phase matching without use of low latency components and processing strategies according to embodiments of the present disclosure.

Figure 19:
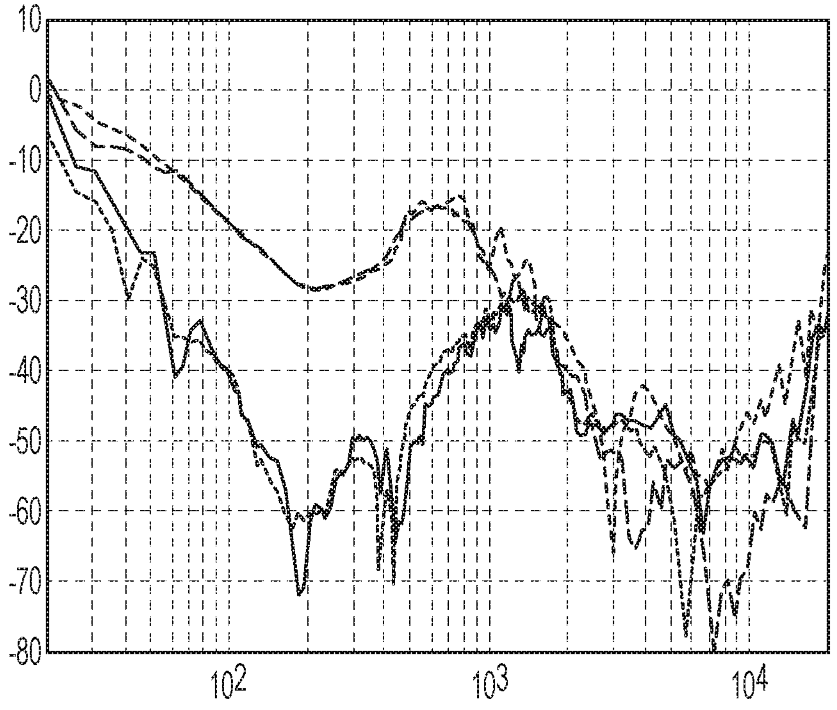

FIG. 19 illustrates measured attenuation before and after feedforward and the realized response of the feedforward transfer function Tff.

As can be seen from the summary and detailed description and review and analysis of the figures, embodiments of the present disclosure may provide several advantages. For example, the adaptive ANR embodiments according to the disclosure are believed to provide the world's quietest aviation headset, and the only one that actively conforms to users and the cockpit environment creating custom noise cancellation and a uniquely personal ANR experience based on measurement of transfer functions and determination of adaptive filter coefficients to compensate for them. The personalized experience is provided by acoustically measuring and actively conforming to the user's ears, environment, and preferences using acoustic response mapping to adaptively adjust various system parameters. This technology uses sound waves and advanced signal processing to measure a user's unique auditory landscape adapting the audio response to the user's ears' size and shape for maximum noise attenuation, voice clarity, and music fidelity.

Various embodiments include streaming quiet ANR to adapt to the environment with one or more ambient microphones to continuously sample ambient noise before it penetrates the ear cup of the headset. An internal error sensing microphone placed near the ear canal monitors ANR performance. The microphones feed information to the CPU, a powerful digital signal processor that analyzes a stream of both the external ambient noise and internal residual noise at a rate of one million times a second, for example, and seemingly instantaneously creates precise ANR responses customized to a dynamic sound environment. The result is a dramatic extension in the amount, consistency, and frequency range of noise cancellation regardless of the environment, fit, and user, allowing important communication to come through with amazing clarity and producing music with outstanding fidelity.

In addition to various personalization features provided by a coupled mobile device such as a smart phone or tablet, embodiments according to the present disclosure leverage the latest technological advances across multiple fields. Rugged cables constructed of silver coated copper alloy wrapped around a Kevlar core deliver extraordinary flexibility, strength, and audio quality. An aviation-friendly CPU provides powerful digital audio processing and convenient access to key controls. Upgradeable firmware provides unlimited potential for new software innovations.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An active noise reduction system, comprising:
- first and second earphones;
- an error sense microphone associated with each of the first and second earphones;
- an ambient noise microphone associated with each of the first and second earphones and coupled to ambient;
- first and second drivers associated with the first and second earphones, respectively; and
- a controller in communication with the error sense microphone, the ambient noise microphone, and the driver, the controller configured to determine adaptive coefficients for a feedforward filter independent of a noise spectrum in response to a first transfer function estimated using one of the error sense microphones and an associated one of the drivers, and a second transfer function estimated using one of the ambient noise microphones and an associated one of the error sense microphones and apply the adaptive coefficients to a feedforward filter between each ambient noise microphone and the associated driver.

2. The system of claim 1, the controller being further configured to determine the adaptive coefficients based on a signal provided to at least one of the drivers, and the transfer function measured using the associated error sense microphone and the associated ambient noise microphone.

3. The system of claim 2 further comprising a communication microphone in communication with the controller, the controller being further configured to determine the adaptive coefficients only when a signal from the communication microphone is less than an associated threshold.

4. The system of claim 2, further comprising a memory in communication with the controller, the controller being further configured to:
- store data used to determine the adaptive coefficients in the memory; and
- retrieve previously stored data from the memory in response to power-on of the system to determine the adaptive coefficients.

5. The system of claim 2 further comprising a memory in communication with a microprocessor, the controller being further configured to:
- store the adaptive coefficients in the memory; and
- retrieve previously stored adaptive coefficients from the memory in response to a system input.

6. The system of claim 1, the controller being further configured to:

apply a stimulus signal to at least one of the drivers, the stimulus signal having predetermined audio characteristics for use in determining the adaptive coefficients for the feedforward filter.

7. The system of claim 1, the controller configured to retrieve previously stored adaptive coefficients or previously stored data associated with the adaptive coefficients from a memory for the feedforward filter.

8. The system of claim 1, the controller being configured to receive personalization settings used to determine the adaptive coefficients from a linked user device.

9. The system of claim 1, the first and second earphones comprising circumaural earcups each having a driver and error sense microphone disposed therein, the system further comprising:

a first covering extending within each earcup and covering the driver and the error sense microphone; and a second covering extending within each earcup to the error sense microphone, the second covering extending over only a portion of the driver and not extending over the error sense microphone.

10. The system of claim 9 wherein the first covering is more acoustically open than the second covering.

11. The system of claim 9 further comprising:

first and second cushions each extending around a periphery of respective earcups, the error sense microphone and the driver being positioned within a respective earcup such that the error sense microphone is closer than the driver to a plane passing through an associated compressed cushion periphery.

12. The system of claim 1, the controller being further configured to:

determine a first instance of the adaptive coefficients during a first time period;

determine a second instance of the adaptive coefficients during a second time period; and apply the second instance of the adaptive coefficients only if a transfer function using the second instance results in a signal having reduced loudness.

13. The system of claim 1, the controller further configured to:

apply a test signal to at least one of the first and second drivers; and determine a driver-to-mic transfer function estimate based on a received signal from at least one of the error sense and ambient noise microphones in response to the test signal.

14. The system of claim 13 wherein the controller determines an estimate of the driver-to-mic transfer function based on an impulse response estimate of the error sense microphone to an impulse applied to at least one of the drivers.

15. The system of claim 1 further comprising a second microphone associated with each earphone, the error sense microphone being positioned closer to an associated driver than the second microphone, the controller configured to perform closed loop feedback control based on a signal from the error sense microphone.

16. The system of claim 15 wherein the first and second earphones comprise circumaural earcups, the second microphone being positioned closer to a plane of an open end of an associated ear cup than the error sense microphone to position the second microphone closer to an ear opening of a user than the error sense microphone.

17. The system of claim 1, the controller configured to:

determine the adaptive coefficients based on first and second signal types associated with the error sense and ambient noise microphones including a first signal type occurring when a) no signal other than an anti-noise signal is provided to the drivers and a second signal type occurring when a test signal is provided to the drivers, or b) when a communication signal received from an external input is provided to the drivers.

18. The system of claim 17 wherein the first signal type is associated with ambient noise detected by the ambient noise microphone and the second signal type is associated with a test signal applied to the driver.

19. The system of claim 17, the controller configured to apply a weighting factor to the first signal type to weight contributions of received signals based on elapsed time from receipt of the signals.

20. An active noise reduction headset, comprising:

first and second earpieces;

first and second sense microphones associated with each of the first and second earpieces, respectively, directed toward an ear opening during use;

first and second ambient noise microphones associated with the first and second earpieces, respectively, and coupled to ambient;

first and second drivers coupled to the first and second earpieces, respectively; and a controller having a microprocessor, the controller in communication with at least one of the first and second sense microphones, at least one of the first and second ambient noise microphones, and at least one of the first and second drivers, the controller configured to measure a first transfer function from ambient noise detected by one of the ambient noise microphones to an associated one of the sense microphones and a second transfer function between one of the sense microphones and an associated one of the drivers, and, in response, determine adaptive filter coefficients using the first and second transfer functions to generate a driver signal applied to at least one of the drivers.

21. The headset of claim 20, the controller configured to apply a test signal to the drivers and determine the adaptive filter coefficients in response to the test signal.

22. The headset of claim 21 wherein the test signal is applied in response to a user input.

23. The headset of claim 21 wherein the test signal is applied to the drivers for use in determining the adaptive filter coefficients, the controller configured to store adaptive filter coefficient data in memory and retrieve the adaptive filter coefficient data in response to subsequent user input for use in determining the adaptive filter coefficients without subsequent application of the test signal.

24. The headset of claim 20, the first and second earpieces comprising circumaural earcups, each earcup having a respective one of the first and second sense microphones, ambient noise microphones, and drivers contained therein.

25. The headset of claim 20 further comprising a communication microphone in communication with the controller.

26. An active noise reduction system, comprising:

first and second earphones;

an error sense microphone associated with each of the first and second earphones;

an ambient noise microphone associated with each of the first and second earphones and coupled to ambient;

a driver associated with each of the first and second earphones; and a controller in communication with at least one of the error sense microphones, at least one of the ambient noise microphones, and at least one of the drivers, the controller configured to generate an output signal for the drivers based on:

a feedforward signal path having an adaptive filter between one of the drivers and an associated one of the ambient noise microphones; and a feedback signal path between one of the drivers and an associated one of the error sense microphones;

wherein the controller adjusts coefficients for the adaptive filter based on estimating a first transfer function between the driver and an associated error sense microphone in response to a test signal output by the driver, and estimating a second transfer function between the ambient noise microphone and the error sense microphone.

27. The system of claim 26 wherein the controller retrieves previously stored coefficients for the adaptive filter upon power-up.

28. The system of claim 26 further comprising a communication microphone coupled to the controller to provide voice input from a user.

* * * * *